United States Patent Office 3,153,656
Patented Oct. 20, 1964

3,153,656
HYDRAZIDES WITH 5-PYRROLIDONE-2-
CARBOXYLIC ACID
John H. Biel, Milwaukee, Wis., assignor to Colgate-
Palmolive Company, a corporation of Delaware
No Drawing. Filed May 16, 1962, Ser. No. 195,301
3 Claims. (Cl. 260—326.3)

This invention relates to chemical compounds having physiological activity. More particularly, this invention is concerned with novel derivatives of therapeutically active compounds of reduced toxicity and side effects and improved therapeutic properties.

This application is a continuation-in-part of my copending applications Serial No. 781,422, filed December 19, 1958, Serial No. 753,086 filed August 4, 1958 and now abandoned, and Serial No. 63,989 filed October 21, 1960, and now abandoned.

It is well known that many hydrazine derivatives have physiological activity and that some are used therapeutically in the treatment of humans and animals. These hydrazine derivatives are primarily sympathomimetic agents but they have a variety of activities, some of which they have in common, including central nervous system stimulating activity and monoamine oxidase inhibiting activity. Many of the hydrazine derivatives, however, have undesirably low therapeutic indices and often induce toxicity symptoms which restrict their use.

According to the present invention it has been found that by converting physiologically active hydrazines to hydrazides of 5-pyrrolidone-2-carboxylic acid, novel derivatives are obtained having the desired physiological activities possessed by the free hydrazines but of greatly improved therapeutic properties and therapeutic ratios. The 5-pyrrolidone-2-carbonyl group apparently has the broad capacity of enhancing the desirable, and reducing the undesirable, physiological properties of the parent hydrazines.

Some of the hydrazides which are provided by this invention and which have improved therapeutic properties over the corresponding "free hydrazines" are the compounds:

(1) 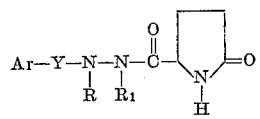

(2) 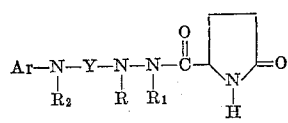

(3) 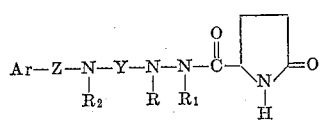

(4) 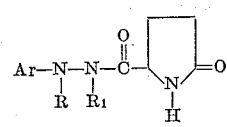

(5) 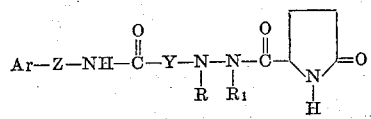

wherein Ar is a cyclic (aryl) group such as phenyl; a substituted phenyl containing one or more nuclear groups such as lower alkyls including methyl, ethyl and propyl, lower alkoxys including methoxy, ethoxy, isopropoxy and butoxy, halogens such as chlorine, bromine and fluorine, nitro and lower alkylenedioxy groups such as 3,4-methylenedioxy and 3,4-ethylenedioxy, Y and Z are the same or different straight or branched chain lower alkylenes such as methylene, ethylene, propylene and isopropylene, R is hydrogen, a lower alkyl such as methyl, ethyl, propyl or isopropyl, or a phenyl-lower alkyl such as benzyl, phenethyl or phenylisopropyl, and $R_1$ and $R_2$ are the same or different groups of the group consisting of hydrogen, a lower alkyl such as methyl, ethyl, or propyl, a lower alkenyl such as allyl or 1-(2-butenyl), a lower alkynyl such as propargyl, or an aralkyl such as a phenyl-lower alkyl including benzyl and phenethyl. The most important compounds are those in which R, $R_1$ and $R_2$ are hydrogen since these are the most active physiologically.

By "free hydrazines" as this term was used above and will be employed infra is meant compounds of the above formulae in which the 5-pyrrolidone-2-carbonyl group is replaced by hydrogen.

Representative of the free hydrazines which can be converted to the hydrazides of 5-pyrrolidone-2-carboxylic acid are disclosed in my copending applications Serial No. 6,380, filed February, 1960, Serial No. 781,422, filed December 19, 1958, Serial No. 840,016, filed September 15, 1959, and now Patent No. 3,000,903, Serial No. 781,191, filed December 18, 1958, and now abandoned, and Serial No. 753,086, filed August 4, 1958, and now abandoned. In addition, the publication in J. Am. Chem. Soc. 81, 2805 (1959) discloses many of the free hydrazines.

Some of the hydrazines which can be converted to the said hydrazide are benzylhydrazine,
beta-phenylethylhydrazine,
N-(3-phenyl-2-propyl)hydrazine,
N-(p-chlorophenylpropyl)-N-methyl hydrazine,
3,4-methylenedioxyphenylethylhydrazine,
p-methoxyphenylbutylhydrazine,
phenylhydrazine,
N-phenyl-N-ethyl hydrazine,
N-phenylaminoethyl hydrazine,
N-phenyl-N-methylaminoethyl hydrazine,
N-phenyl-N-ethylaminoisopropyl hydrazine,
N-benzyl-N-methylaminoethyl hydrazine,
N-o-chlorobenzyl-N-methylaminoisopropyl hydrazine,
N-(1-phenyl-2-propyl)-aminoethyl hydrazine,
N-(1-phenyl-2-propyl)-aminoisopropyl hydrazine,
N-phenethylaminoisopropyl hydrazine,
N-benzylaminoethyl hydrazine,
beta-(N-benzyl)-carboxamidoethylhydrazine,
(N-phenethyl)-carboxamidoisopropylhydrazine,
(N-phenylisopropyl)-carboxamidoisopropylhydrazine,
beta-methylphenethylhydrazine,
beta-(N-benzyl-N-methylamino)-ethylhydrazine,
beta-(N-o-methylbenzyl-N-methylamino)-ethylhydrazine,
N-phenylisopropyl-N'-ethyl hydrazine,
N-benzyl-N-ethyl-N'-methyl hydrazine and
N-beta-phenethyl-N'-propargyl hydrazine.

The novel hydrazides of this invention can be produced by reacting the appropriate hydrazine with a 5-pyrrolidone-2-carboxylic acid having an "activated" group such as the acid azide of the formula

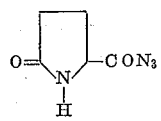

the mixed anhydride of the formula

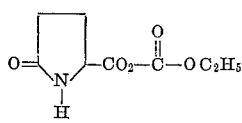

or the cyanomethyl ester of the formula

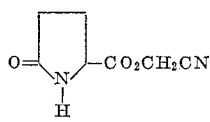

The condensation reaction between the hydrazine and a 5-pyrrolidone-2-carboxylic acid having an "activated" carboxyl group is effected by bringing the reactants together in a suitable liquid reaction medium such as ethanol or dichloromethane. The D or L or DL form of 5-pyrrolidone-2-carboxylic acid can be used in the reaction. A tertiary amine such as triethylamine can be included in the reaction medium to remove any acid byproducts formed. The reaction usually proceeds at room temperature although higher temperatures can be employed as needed. The desired product can be isolated from the reaction mixture by conventional procedures.

An alternative method of producing the compounds is by the condensation of an appropriate hydrazine in the presence of 5-pyrrolidone-2-carboxylic acid, as the free acid, in the presence of a dehydrating agent such as dicyclohexylcarbodiimide, 1-cyclohexyl-3-(beta-morpholinoethyl)-carbodiimide methyl tosylate, sodium phosphite or sodium pyrophosphite. The reaction is effected in a liquid reaction medium and at room temperature or slightly higher. After filtering, the product can be isolated from the reaction mixture by conventional means.

By means of the described processes hydrazides of 5-pyrrolidone-2-carboxylic acid and hydrazines as described and such as those previously named can be produced including N-(5-pyrrolidone-2-carbonyl-N'-benzyl hydrazine, N-(5-pyrrolidone-2-carbonyl)-N' - (1 - phenyl-2-propyl)-hydrazine, N-(5-pyrrolidone - 2 - carbonyl)-N'-(3,4-methylenedioxyphenylethyl)-hydrazine, N-(5-pyrrolidone-2-carbonyl)-N'-phenyl-N'-ethyl hydrazine, N - (5-pyrrolidone - 2 - carbonyl) - N' - (phenylaminoethyl) - hydrazine and N-(5-pyrrolidone-2-carbonyl)-N'-[beta-(N-benzylcarboxamido)-ethyl]-hydrazine.

The hydrazides with which this invention is concerned can be produced by reacting 5-pyrrolidone-2-carboxylic acid hydrazide with an appropriately substituted alkyl ketone or aldehyde to produce an intermediate N-(5-pyrrolidone-2-carbonyl)-N'-(substituted alkylidenyl)-hydrazine followed by reduction of the hydrazone to the desired compound. This process can be represented as follows:

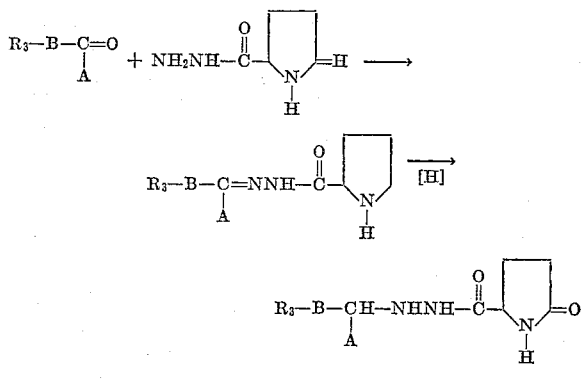

wherein A is a lower alkyl, B is a lower alkylene and $$-B-CH- \atop A$$

has the same meaning as Y above, and $R_3$ represents the groups Ar,

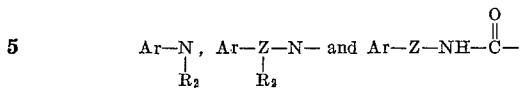

Some of the ketones and aldehydes which can be used in the process are phenylacetaldehyde, phenylpropionaldehyde, phenylbutyraldehyde, phenylacetal, phenylvaleraldehyde, phenylethanone, phenylacetone, phenylpentanone, p-chlorophenylbutanone, N-phenylamino acetaldehyde, 2-(N-o-chlorophenyl-N-ethylamino) - propionaldehyde, N-phenyl-N - ethylaminopropyl methylketone, N-benzyl-N-methylamino acetaldehyde, 2-(N-o-chlorobenzyl-N-ethylamino)-propionaldehyde and N-phenethyl-N-ethylaminopropyl methyl ketone.

Reaction between 5-pyrrrolidone-2-carboxylic acid hydrazide and the aldehyde or ketone is conveniently effected by contacting the reactants in the presence of water or a lower alcohol. The reaction proceeds at room temperature although slightly elevated temperatures may be employed to increase the rate of reaction. Recovery of the intermediate alkylidenyl hydrazine, or hydrazone, is conveniently effected by conventional methods. Thus, the product, generally an oil as the free base, may be salted out with an alkali metal hydroxide and extracted with a water immiscible organic solvent such as ether. The product is readily isolated by distillation under reduced pressure.

The intermediate hydrazone may be reduced to the corresponding hydrazide by use of a suitable reducing agent. Catalytic reduction with catalysts such as rhodium, platinum oxide and palladium in solvents such as tetrahydrofuran, water, ethyl acetate or dioxan is particularly satisfactory. Hydrogen pressures of about 50 to 3000 p.s.i. may be used. The temperature of reduction may be room temperature or increased temperatures such as up to 80° C.

Hydrazides of the above formulae can be produced in this way.

The activity of a representative hydrazine compared with that of the hydrazide of this invention can be illustrated by the activity of 1-phenyl-2-propyl hydrazine (Cpd. 1) and N-(5-pyrrolidone-2-carbonyl)-N'-(1-phenyl-2-propyl)hydrazine (Cpd. 2) as shown in Table 1.

TABLE 1

| Compound | $ED_{50}$[1] 5-HT | Loss of Weight[2] | Lethality | |
|---|---|---|---|---|
| | | | Dose | No. Dead/No. Used |
| Cpd. 1 | 0.9 | 3 | 16 | 6/8 |
| Cpd. 2 | | | 18 | 0/4 |
| | 1.0 | 2-6 | 54 | 4/4 |

[1] Dose (mg./kg.) which causes a 50% increase in 5-hydroxytryptamine (serotonin).
[2] Dose (mg./kg.) which causes a 50% decrease in growth rate.

There was a marked decrease in lethality and cardiovascular effects for the hydrazide compared with the hydrazine without impairment of the desired therapeutic activity.

The hydrazides provided by this invention can be administered in pharmaceutical unit dosage forms such as powders, capsules, tablets and suppositories and can contain any suitable amount of the hydrazide. Thus, the unit dosages can contain about 5 to 50 mgm. of a hydrazide with the precise amount to be determined by the activity of the specific hydrazide used and the regime of treatment contemplated.

The following examples are presented to illustrate the invention.

Example 1
5-PYRROLIDONE-2-CARBOXYLIC ACID HYDRAZIDE

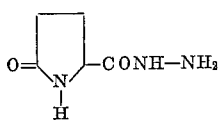

A mixture containing 15.6 g. (0.12 mole) of methyl 5-pyrrolidone-2-carboxylate, 10.3 g. of 85% hydrazine and 200 cc. of ethanol is refluxed for several hours, the ethanol removed by distillation and the residue crystallized from a mixture of ethanol-ethyl acetate, yield 14.2 g. (91%), M.P. 113–115° C.

Example 2
N-(5-PYRROLIDONE-2-CARBONYL-N'-BENZYLIDENYL HYDRAZINE

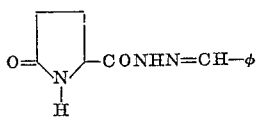

2-carbethoxy-5-pyrrolidone is converted to 5-pyrrolidone-2-carbonyl hydrazide by refluxing the ester with a methanolic solution of hydrazine hydrate. The hydrazide is isolated in the usual manner and 0.10 mole of it reacted with 0.10 mole of benzaldehyde in methanol at reflux temperature for one hour. The methanol solution contains this product.

Example 3
N-(5'-PYRROLIDONE-2-CARBONYL)-N'-BENZYL HYDRAZINE

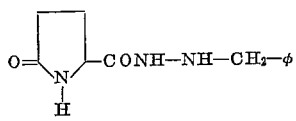

A methanol solution containing 0.10 mole of the benzylidene derivative of Example 2 is subjected to hydrogenation at 40 p.s.i. of hydrogen in the presence of 0.1 g. of platinum oxide catalyst. Hydrogenation is discontinued as soon as the theoretical amount of hydrogen has been absorbed to prevent cleavage of the benzyl group. The catalyst is removed by filtration and the solvent removed by distillation. The residue is an oil which does not readily crystallize.

Example 4
N-(5-PYRROLIDONE-2-CARBONYL-N'-(1-PHENYL-2-PROPYLIDENYL)-HYDRAZINE

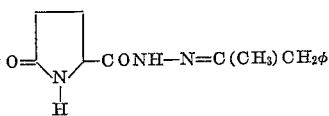

A mixture of 37 g. (0.26 mole) of the hydrazide from Example 1 and 67 g. (0.50 mole) of phenylacetone, 100 cc. of isopropanol and 75 cc. of ethanol is refluxed for 6 hours. The solvents are removed by distillation and the residue recrystallized from ethanol, yield 62 g. (92%), M.P. 153° C.

Analysis.—Calcd. for $C_{14}H_{17}N_2O_3$: N, 16.20. Found: N, 15.35.

Example 5
N-(5-PYRROLIDONE-2-CARBONYL)-N'-(1-PHENYL-2-PROPYLHYDRAZINE

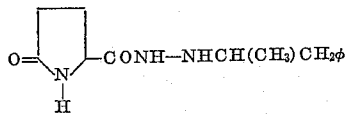

The acyl hydrazone (12.95 g.) of Example 4 is reduced with 0.50 g. of $PtO_2$ in 200 cc. of ethanol at 60 lbs. of hydrogen. The solvent is removed by distillation and the residue crystallized from ether. The solid is recrystallized from acetonitrile, M.P. 160° C.

Analysis.—Calcd. for $C_{14}H_{19}N_2O_3$: N, 16.08. Found: N, 15.95.

Example 6
N-(5-PYRROLIDONE-2-CARBONYL-N'-[β-(N-BENZYL-N-PROPARGYL)-AMINOETHYL]-HYDRAZINE A mixture containing 37 g. (0.26 mole) of the hydrazide from Example 1 and 93.5 g. (0.50 mole) of N-benzyl-N-propargylaminoacetaldehyde, 100 cc. of isopropanol and 75 cc. of ethanol is refluxed for six hours. The solvents are removed by distillation and the residue recrystallized from ethanol. The hydrazone is then subjected to hydrogenation in the presence of 0.50 g. $PtO_2$ in 200 cc. of ethanol at 60 lbs. of hydrogen. The solvent is removed by distillation, the base taken up in ether and converted to the hydrochloride salt by means of ethereal hydrochloric acid.

Example 7
N-(5-PYRROLIDONE-2-CARBONYL)-N'-[1-o-CHLORO)-PHENYL-2-PROPYL]-HYDRAZINE A mixture of 37 g. (0.26 mole) of the hydrazide from Example 1 and 85 g. (0.50 mole) of o-chlorophenylacetone, 100 cc. of isopropanol and 75 cc. of ethanol is refluxed for six hours. The solvents are removed by distillation, the residue recrystallized from ethanol, the solid hydrazone dissolved in 200 cc. of ethanol and subjected to hydrogenation at 60 lbs. of hydrogen and in the the presence of 0.50 g. of $PtO_2$. The solvents are removed by distillation and the residue crystallized from ether. The base is recrystallized from acetonitrile.

Example 8
N-(5-PYRROLIDONE-2-CARBONYL)-N'-(3,4-METHYLENE-DIOXYBENZYL)-HYDRAZINE A mixture of 0.10 mole of the hydrazide of Example 1 and 0.10 mole of 3,4-methylenedioxybenzaldehyde in 150 cc. of methanol is refluxed for one hour. To this solution is added 0.5 g. of $PtO_2$ and the mixture subjected to hydrogenation at 60 lbs. of hydrogen. As soon as the theoretical amount of hydrogen has been taken up, the hydrogenation is stopped and the product is isolated by distillation of the solvent following removal of the catalyst. The residue is an oil which does not crystallize readily.

Various changes and modifications of the invention can be made and, to the extent that such variations incorporate the spirit of this invention, they are intended to be included within the scope of the appended claims.

What is claimed is:

1. N-(5-pyrrolidone - 2 - carbonyl)-N'-[beta-(N-benzyl-N-propargyl)-aminoethyl]-hydrazine.

2. N-(5-pyrrolidone - 2 - carbonyl-N'-[1-(o-chloro)-phenyl-2-propyl]-hydrazine.

3. N-(5-pyrrolidone - 2 - carbonyl)-N'-(3,4-methylenedioxybenzyl)-hydrazine.

References Cited in the file of this patent

UNITED STATES PATENTS 2,951,849    Gutman et al. ------------ Sept. 6, 1960

UNITED STATES PATENT OFFICE
CERTIFICATE OF CORRECTION

Patent No. 3,153,656                      October 20, 1964

John H. Biel

It is hereby certified that error appears in the above numbered patent requiring correction and that the said Letters Patent should read as corrected below.

Column 2, line 25, for "February, 1960" read -- February 3, 1960 --; column 3, lines 57 to 66, the right side of the formulas, each occurrence, should appear as shown below instead of as in the patent:

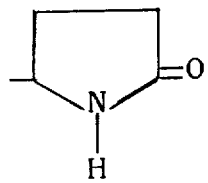

column 4, lines 5 to 7, for $$Ar-Z-N- \atop R_2 \qquad \text{read} \qquad Ar-Z-N- \atop R_2$$

column 6, line 27, for that portion of the title reading "-[1-o-CHLORO)-" read -- -[1-(o-CHLORO)- --; line 37, strike out "the", second occurrence; line 62, for "-carbonyl-N'-" read -- -carbonyl)-N'- --.

Signed and sealed this 23rd day of March 1965.

(SEAL)
Attest:

ERNEST W. SWIDER                      EDWARD J. BRENNER
Attesting Officer                   Commissioner of Patents